United States Patent [19]

Lesea

[11] Patent Number: 5,477,112
[45] Date of Patent: Dec. 19, 1995

[54] BALLASTING NETWORK WITH INTEGRAL TRAP

[75] Inventor: Ronald A. Lesea, Redwood City, Calif.

[73] Assignee: Electronic Lighting, Inc., Menlo Park, Calif.

[21] Appl. No.: 53,144

[22] Filed: Apr. 27, 1993

[51] Int. Cl.$^6$ ............ H05B 41/24; H02M 7/537
[52] U.S. Cl. .......... 315/219; 315/209 R; 315/244; 315/DIG. 7; 363/134; 331/113 A; 331/76
[58] Field of Search ............ 315/219, 244, 315/DIG. 7, 209 R, 247, 111.21; 363/24, 26, 39, 40, 17, 97, 134, 45, 47; 331/113 A, 76

[56] References Cited

U.S. PATENT DOCUMENTS

| | | | |
|---|---|---|---|
| 4,286,316 | 8/1981 | Friend | 363/131 |
| 4,538,093 | 8/1985 | Melai | 315/219 |
| 4,672,522 | 6/1987 | Lesea | 363/48 |
| 4,808,887 | 2/1989 | Fahrnich et al. | 315/247 |
| 4,935,669 | 6/1990 | Nilssen | 315/105 |
| 5,019,959 | 5/1991 | MacDonald et al. | 363/134 |
| 5,021,716 | 6/1991 | Lesea | 315/219 |
| 5,028,846 | 7/1991 | Lesea | 315/219 |
| 5,159,541 | 10/1992 | Jain | 363/26 |
| 5,175,475 | 12/1992 | Lesea et al. | 315/244 |
| 5,315,215 | 5/1994 | Lesea | 315/219 |

FOREIGN PATENT DOCUMENTS

| | | | |
|---|---|---|---|
| 1388278 | 12/1964 | France | 363/40 |
| 0023876 | 2/1977 | Japan | 315/DIG. 7 |
| 0085976 | 7/1978 | Japan | 315/219 |
| 41663889 | 6/1992 | Japan | 315/244 |

Primary Examiner—Robert J. Pascal
Assistant Examiner—Arnold Kinkead
Attorney, Agent, or Firm—Thomas E. Schatzel

[57] ABSTRACT

Briefly, to reduce switching stresses, employed is a high-frequency AC power source (110) and a current-limiting (ballasting) network (116). The network (116) includes a high-frequency trap (120) and an impedance transforming network (122), which is coupled to the AC power source (110) by the trap (120) and which is for connection to a load that includes at least one gaseous discharge (fluorescent) lamp or other non-linear or negative-resistance load (102). The trap, which has the parallel resonant combination of an inductor (130) and a capacitor (132), is resonant at a frequency chosen such that the switching-circuit transistor(s) (210, or 230 and 232, or 250 and 252, or 270 and 272, or 708) of the AC power source (110) switch at times when the level of the current (charge flowing) therein and/or the voltage developed there across is zero, preferably, at a frequency slightly higher than a harmonic frequency of the high-frequency AC power source (110).

3 Claims, 2 Drawing Sheets

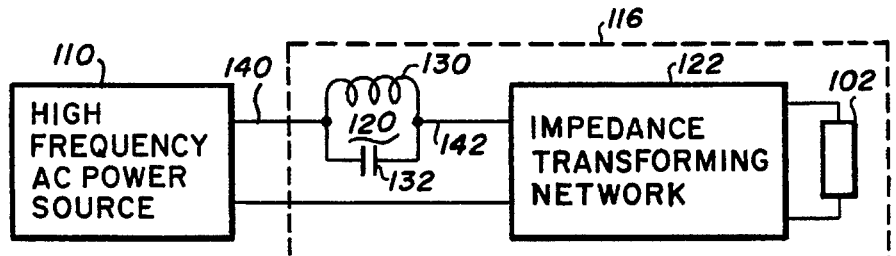
Fig._1
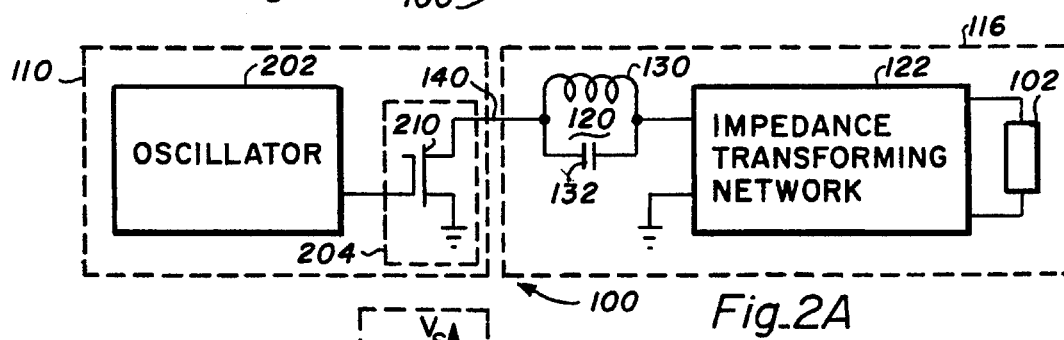
Fig._2A
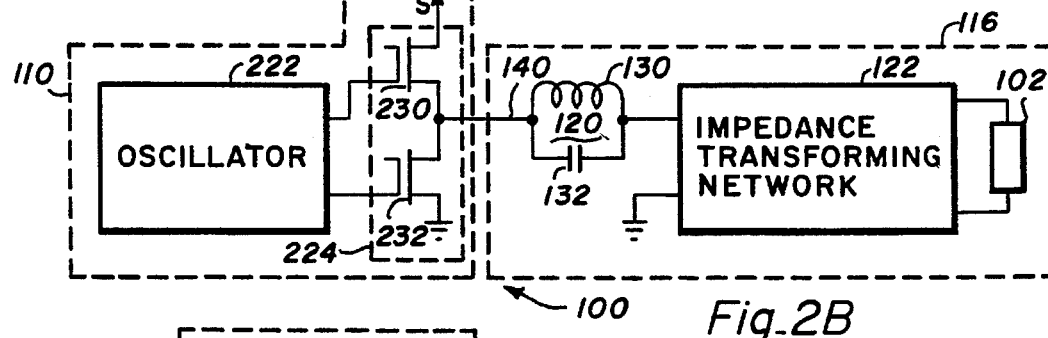
Fig._2B
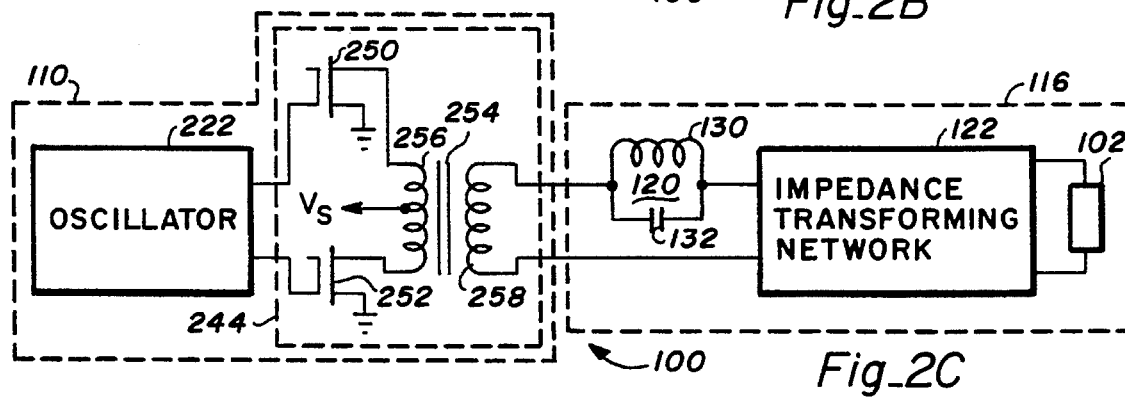
Fig._2C
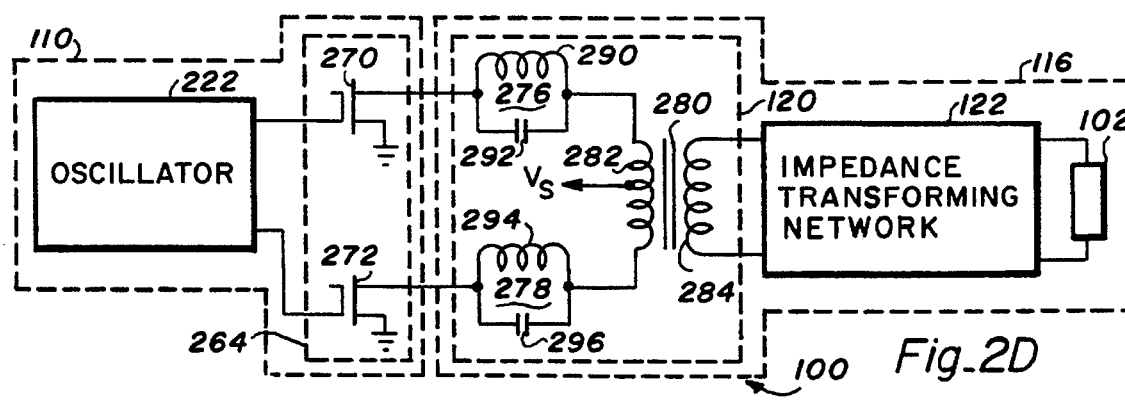
Fig._2D

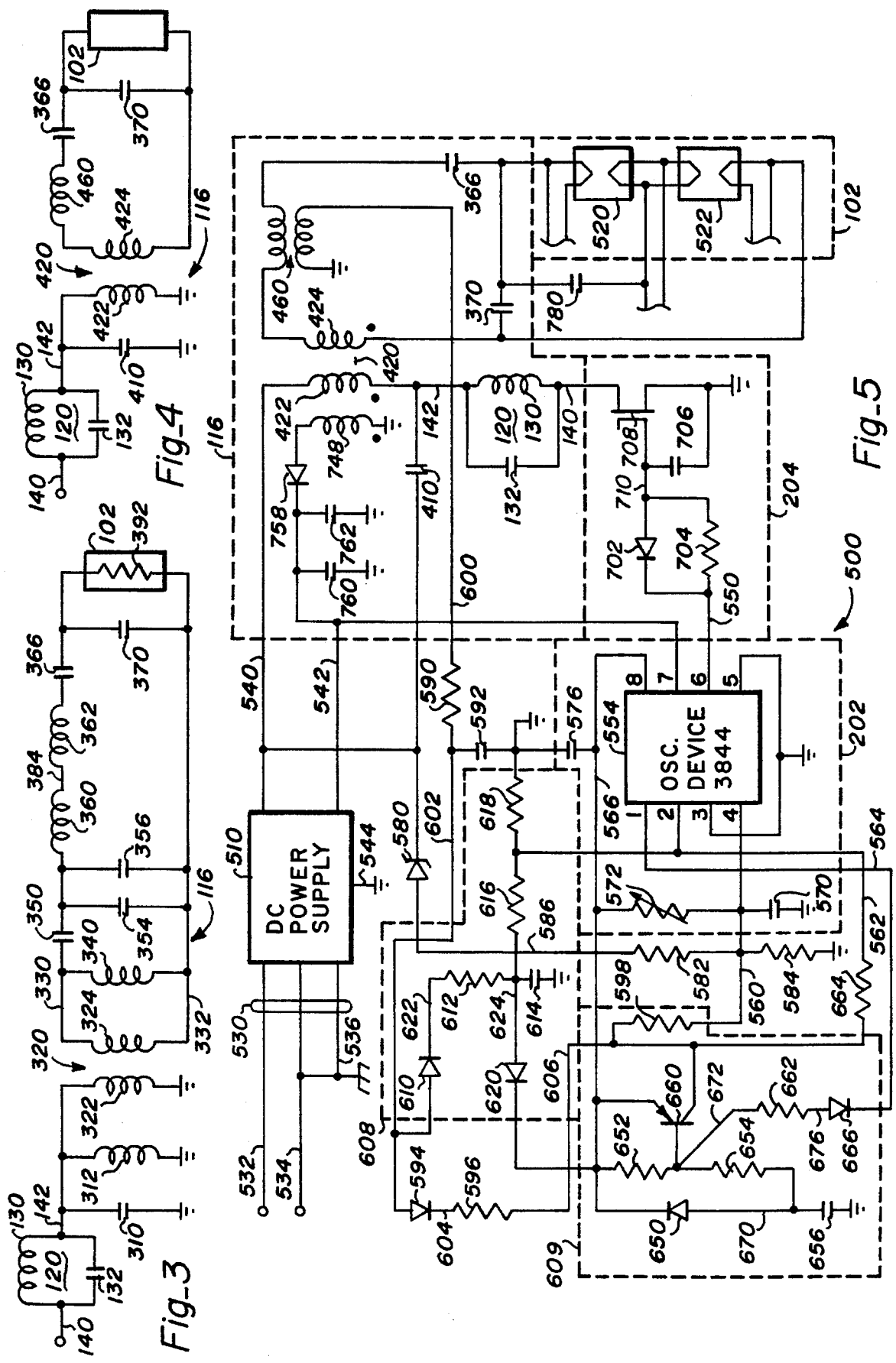

BALLASTING NETWORK WITH INTEGRAL TRAP

BACKGROUND OF THE INVENTION

1. Field of the Invention

The present invention relates to the field of energy conversion for lighting generally and more particularly to an electronic ballast suitable for use with gaseous-discharge lamps or other non-linear or negative-resistance loads.

2. Description of the Related Art

Gaseous-discharge lamps, i.e. lamps in which light is generated when an electric current or discharge is passed through a gaseous medium, are well known to the lighting field. Fluoresecent-type gaseous-discharge lamps have been employed for years to provide relatively efficient indoor lighting, such as for office buildings.

Unlike incandescent lamps, which are self-current limiting as a result of their positive-resistance characteristics, gaseous-discharge lamps have a negative-resistance characteristic. For this reason, gaseous-discharge lamps are operated in conjunction with a ballast, which provides the requisite current limiting. Traditionally, ballasts are of core and coil construction. One form is that of a simple choke which provides an inductive impedance for current limiting. Another form is that of a transformer. The transformer form permits voltage conditioning, such as providing a high break-down potential, which is required for starting instant-start-type fluorescent lamps by ionizing to a plasma the gas therein. For rapid-start-type fluorescent lamps, the transformer includes a pair of windings for energizing the lamp filaments and separated by a high-voltage winding having a high reactance for current limiting. Additionally, a magnetic shunt may be included in the transformer to limit the energy transferred through the magnetic path.

Unfortunately, traditional core-and-coil-type ballasts are relatively inefficient due to substantial heat generated losses that are generally equally divided between copper losses in the coil and core losses in the relatively inexpensive grades of iron employed therein. For example, a traditional core-and-coil-type ballast employed in a dual forty watt lamp fixture may dissipate from ten to fifteen watts, causing the ballast to run hot. Further, in many applications, such as in office buildings, this ballast-generated heat must be removed by air conditioning equipment, which is itself relatively inefficient. Another problem is that core-and-coil-type ballasts are relatively heavy in weight and thereby requiring that associated fixtures be substantial in size and strength.

The regulation afforded by traditional core-and-coil-type ballasts is also relatively poor. Typically, the operating level of fluorescent fixtures employing such ballasts varies directly with the power-line voltage. Thus, in many applications, excessive lighting is often employed to insure that minimum lighting levels are achieved resulting in dissipation of excessive power.

Among other problems associated with gaseous-discharge lamps is that they are less efficient when operated at the normal sixty Hz line frequency than when operated at higher frequencies. Fluorescent lamps are often difficult to start when cold and consequently flicker for some time until they are sufficiently warm. Fluorescent lamps require core-and-coil-ballast phasing both to reduce stroboscopic effects and to increase the power factor such lamps present to the AC power line via the ballast.

Also, core-and-coil-type ballasts provide little isolation from the AC power line. Consequently, such ballast may pose a safety hazard due to potential electrocution to persons who come in contact with them.

These problems are overcome by the "Single-Ended Ballast Circuit", which is disclosed in U.S. Pat. No. 5,028,846. Briefly, the above-mentioned circuit employs a DC power supply, a free-running oscillator, a transistor (switch), and a current-limiting (ballasting) network, all configured to generate a high-frequency AC power source on a line. Specifically, the transistor is configured as a switch responsive to a signal generated by the oscillator and operative to periodically couple the line to a circuit common. For this purpose, the transistor gate is connected to the output of the oscillator, the transistor drain is connected to the line, and the transistor source is connected to the circuit common. The current-limiting (ballasting) network is shown (in FIG. 3 of the above-mentioned patent) to include a first capacitor, which is connected between the line and the circuit common. In addition, the network includes a transformer (inductive means) having a primary winding connected between a DC power supply potential and the line and a secondary winding. The network further includes an inductor and two other capacitors connected in series across the transformer secondary winding. Two fluorescent lamps are connected in series across one of the capacitors. The network is operative to provide an impedance transformation to couple the fluorescent lamps to the high-frequency AC power source developed on the line. The network develops the desired open circuit output voltage for starting the fluorescent lamps. In addition, the network provides the desired source impedance as seen by the lamps. Also, the network establishes the operating Q for the desired output waveform and the desired load impedance and phase angle, as seen by the transistor, for both the operating and open circuit conditions. Finally, the network is operative to provide an inductive power supply feed for the transistor.

Unfortunately, in the above-mentioned ballast circuit (and most other so-called "single ended" designs using one power transistor switch), there are many disadvantages which limit the applications or have cost disadvantages. Specifically, the disadvantages for the circuit of U.S. Pat. No. 5,028,846 are as follows:

1. The voltage Waveform across the switch transistor (and the first network capacitor) is a continuous series of (nearly) half-sine pulses which creates a voltage stress during the "off tile" of the switch at least 3.2 times the instantaneous voltage of the DC supply voltage. This limits this circuit to AC supply voltages of 120 volts or less, and/or requires the use of an expensive transistor;

2. Since the first network capacitor is directly across the switch transistor, it also must be rated to handle the maximum peak voltage and the current stress due to the waveforms shape;

3. For maximum efficiency (very important for electronic ballasts) zero-voltage or zero-current switching for the power transistor is necessary. This circuit can have zero-voltage switching on the trailing edge of the half-sine pulse only if the voltage falls to zero before the switch is turned on.

The exact shape of these half-sine pulses on the trailing edge is determined by the network component values, including the load impedance. The actual lamp impedance is sensitive to temperature and the circuit sensitivity to load impedance is quite high. This means that, if zero-switching is to be assured, the network values must assure slight "under-damping" for the worst-case load impedance. Thus, the circuit can be very much under-damped for other than worst-case load conditions. More under-damping means even higher switch voltage stress (4 or more times the DC supply). This dilemma means that a trade-off must be made between ballast efficiency and transistor cost;

4. These half-sine pulses at the input to the network also create inefficiency in the network itself. The harmonics due to the half-sine shape increase the losses primarily in the two magnetic components, further reducing ballast efficiency or increasing cost;

5. The half-size pulse waveshape can also cause problems witch the lamp current waveshape, unless the network has sufficiently high "Q". Unfortunately, high Q means either lower efficiency or higher cost;

6. The actual lamp impedance also depends on the lamp current. Unless a low-ripple (more expensive) DC supply is used, this lamp characteristic will create additional load variations during the AC line cycle that need to be accounted for in the worst-case design dilemma described in 3., above.

SUMMARY OF THE INVENTION

It is therefore a primary object of the invention to provide a ballast circuit that allows employment of relatively inexpensive transistor(s).

Another object of the invention is to provide a ballast circuit which is relatively simple and inexpensive.

Another object of the invention is to provide a ballast circuit which relatively efficient.

Another object of the invention is to provide a ballast circuit such that the efficiency is relatively insensitive to load impedance.

Still another object of the invention is to provide a ballast circuit which can use a relatively high ripple DC supply.

Briefly, a ballast circuit of a preferred embodiment of the present invention employs a high-frequency AC power source and a current-limiting (ballasting) network. The network includes at least one high frequency trap and an impedance-transforming network which is coupled to the AC power source by the trap and which may be connected to a load of at least one gaseous discharge (fluorescent) lamp or other non-linear or negative resistance load. The trap has a parallel-resonant combination of an inductor and a capacitor and resonates at a chosen frequency to cause switching-circuit transistor(s) to switch at times when the level of the current (charge flowing) therein and/or the voltage developed there across is zero. Preferably, the frequency is slightly higher than a harmonic frequency of the high-frequency AC power source.

The inclusion of the trap allows a significant degree of freedom to enable designs which can have zero-switching essentially controlled by the trap component values. Also, the trap can allow a significant reduction in voltage and/or current stresses in the transistor switch(es). Further, the inclusion of the trap can significantly reduce the harmonics in the rest of the ballasting network, resulting in better load waveforms and higher network efficiency.

These and other objects of the present invention will no doubt become apparent to those skilled in the art after having read the detailed description of the presently preferred embodiment of the present invention which is illustrated in the FIGS. of the drawing.

BRIEF DESCRIPTION OF THE FIGS. IN THE DRAWING

FIG. 1 is a combined block and schematic diagram of the ballast circuit in accordance with the present invention;

FIG. 2A is a combined block and schematic diagram of a single-ended variation of the ballast circuit of FIG. 1;

FIG. 2B is a combined block and schematic diagram of a half-bridge variation of the ballast circuit of FIG. 1;

FIG. 2C is a combined block and schematic diagram of a push-pull variation of the ballast circuit of FIG. 1;

FIG. 2D is a combined block and schematic diagram of another push-pull variation of the ballast circuit of FIG. 1;

FIG. 3 is a schematic diagram of an embodiment of the current-limiting (ballasting) network of FIG. 1, from which the presently preferred embodiment is derived;

FIG. 4 is a schematic diagram of the presently preferred embodiment of the current-limiting (ballasting) network of FIG. 1; and FIG. 5 is a detailed schematic diagram of the ballast circuit of FIG. 1.

DETAILED DESCRIPTION OF THE PREFERRED EMBODIMENT

FIG. 1 illustrates a ballast circuit of the present invention for driving a load and referred to by the general reference character 100. The circuit 100 includes at least one gaseous-discharge (fluorescent) lamp 102. Ballast circuit 100 is shown to employ, as principal components, a high-frequency AC power source 110 and a current-limiting (ballasting) network 116, for coupling the load 102 to the power source 110. Current-limiting network 116 includes (at least one) high-frequency trap 120 and an impedance-transforming network 122. Network 122 is coupled to source 110 by trap 120 and to the load 102. Trap 120 has an inductor 130 and a capacitor 132 connected in parallel and to a line 140 extending to power source 110 and to a line 142 extending to network 122. Capacitor 132 and inductor 130 are resonant at a frequency chosen such that the switching-circuit transistors, including those shown in FIGS. 2A–2D of the power source 110 switch at times when the current level therein and/or the voltage developed there across is zero. Preferably, capacitor 132 and inductor 130 are resonant at a frequency slightly higher than a harmonic frequency of power source 110. Although, with some retuning, even harmonics of power source 110 are employed, preferably, capacitor 132 and inductor 130 are resonant at a frequency slightly higher than an odd harmonic of power source 110.

A single-ended variation of the ballast circuit 100 is shown in FIG. 2A. Again, ballast circuit 100 employs the power source 110 and current-limiting (ballasting) network 116. In this variation, the power source 110 employs an oscillator 202 and a switching circuit 204. Switching circuit 204 includes, as a principal component, a transistor 210 with a gate coupled (by components not shown) to the output of oscillator 202, a source connected to a circuit common, and a drain coupled by line 140 to trap 120. For this embodiment, with the trap resonant at a frequency slightly higher than the third harmonic, the voltage waveform on the drain of transistor 210 is changed (absent the trap) from an essentially half sine pulse with a concomitant high peak value to a complex waveform that consists of the fundamental with third harmonic subtracted (due to the phase) such that the high voltage peak is significantly reduced. The trap in this case also significantly reduces the harmonics (especially third) present at the input to network 122. Indeed, this network 122 input voltage waveform can be nearly sinusoidal, improving the resulting load waveform and increasing network efficiency by reducing the dissipation of harmonic power in the network components.

A half-bridge variation of ballast circuit 100 of FIG. 1 is shown in FIG. 2B. Again, ballast circuit 100 employs power source 110 and current-limiting network 116. In this variation, the power source 110 employs an oscillator (pulse generator) 222 and a switching circuit 224. Oscillator 222 has a pair of outputs at which the oscillator generates signals which are in opposite phase. Switching circuit 224 includes a pair of transistors 230 and 232. Transistor 230 is connected with a gate coupled to an output of oscillator 222, a source coupled by line 140 to trap 120 and a drain connected to a DC power-supply potential Vs. Transistor 232 is connected with a gate coupled to the other output of oscillator 222, a source coupled to a circuit common, and a drain coupled by line 140 to trap 120. For additional details of oscillator 222 and switching circuit 224, reference may be made to U.S. Pat. No. 4,415,839.

A push-pull variation of ballast circuit 100 of FIG. 1 is shown in FIG. 2C. Again, ballast circuit 100 employs power source 110 and current-limiting (ballasting) network 116. In this variation, the power source 110 employs the oscillator 222 and a switching circuit 244 that includes a pair of transistors 250 and 252 and a transformer 254 having a center tapped primary winding 256 and a secondary winding 258. Transistor 250 is connected with a gate coupled to one output of oscillator 222, a source coupled to a circuit Common and a drain connected to one of end of primary winding 256. Transistor 252 is with a gate coupled to the other output of oscillator 222, a source coupled to the circuit common, and a drain connected to the other end of primary winding 256. The center tap of primary winding 256 is connected to a DC power supply potential Vs, and secondary winding 258 is connected to trap 120.

In an alternative embodiment of FIG. 2C, the transformer 254 is in the form of an auto transformer (which does not have a secondary winding) with the impedance transforming network 122 coupled by the trap 120 across (a portion of) the primary transformer winding 256.

Another push-pull variation of ballast circuit 100 of FIG. 1 is shown in FIG. 2D. Again, ballast circuit 100 employs power source 110 and current-limiting (ballasting) network . 116 In this variation, the power source 110 employs oscillator (pulse generator) 222 and a Switching circuit 264 that includes a pair of transistors 270 and 272. Transistor 270 is connected with a gate coupled to one output of oscillator 222 and a source coupled to a circuit common. Transistor 272 is connected with a gate coupled to the other output of oscillator 222 and a source coupled to the circuit common. The trap 120 includes a pair of similar, high-frequency traps 276 and 278 and a transformer 280. Transformer 280 has a center tapped primary winding 282 and a secondary winding 284. Trap 276 has an inductor 290 and a capacitor 292, connected in parallel with one end connected to a drain Of transistor 270 and a second end connected to an end of primary winding 282. Similarly, trap 278 has an inductor 294 and a capacitor 296 connected in parallel with one end connected to a drain of transistor 272 and a second end connected to the other end of primary winding 282. The center tap of transformer 280 primary winding 282 is connected to a DC power supply potential Vs. Impedance-transforming network 122 is connected to secondary winding 284 and to the load 102.

In an alternative embodiment of FIG. 2D, the transformer 280 is in the form of an auto transformer (which does not have a secondary winding), with the impedance transforming network 120 connected across (a portion of) the primary transformer winding 282.

Although the transistors 210, 230, 232, 250, 252, 270 and 272 of FIGS. 2A–2D are shown as field-effect types, other types of devices may be employed, including bipolar transistors, IGBT-type devices and SCR-type devices.

FIG. 3 is an embodiment of current-limiting (ballasting) network 116. Network 116 includes trap 120 with the parallel combination of inductor 130 and capacitor 132 connected between lines 140 and 142. Network 116 further includes a shunt capacitor 310 connected between line 142 and the circuit common. Between line 142 and the circuit common is an inductor 312, which represents the shunt primary inductance of a "real" transformer. Further, an "ideal" transformer 320 is included with a primary winding 322 connected between line 142 and the circuit common and a secondary winding 324 connected between a line 330 and a line 332. Representing the shunt secondary inductance of a "real" transformer, is an inductor 340 connected across secondary winding 324, between lines 330 and 332. Network 116 further includes a series capacitor 350, a pair of shunt capacitors 354 and 356, a pair of series inductors 360 and 362, a DC-blocking and Q-enhancing capacitor 366, and another shunt capacitor 370. Capacitor 350 is connected between inductor 340 and capacitor 354 and capacitors 354 and 356 are each connected in parallel between capacitors 350i and line 332. Inductors 360 and 362 are connected in series with a line 384 and with inductor 362 joined to capacitor 366. Capacitor 370 is connected between capacitor 366 and line 332 and across the load 102 having a load resistance 392. Inductor 340 and capacitors 350 and 354 form what is referred to herein as an "LCC" network. In addition, capacitors 356 and 370 and inductors 360 and 362 form what is referred to herein as a low-pass pi network.

Preferably, the values for the components of current-limiting network 116 are calculated in accordance with the following equations.

$q_4 = ((r_{(392)}/r_{m3}) - 1)^{1/2}$
$q_3 = ((r_{m3}/r_{m3}) - 1)^{1/2}$
$q_1 = ((r_{m1}/r_{in}) - 1)^{1/2}$
$q_2 = ((n^2 * r_{m1}/r_{m2}) - 1)^{1/2}$
$x_{l(130)} = (8/9) * x_{l(120)}$
$x_{c(132)} = -9 * x_{l(130)}$
$x_{l(120)} = r_{in} * ((r_{m1}/r_{in}) - 1)^{1/2}$
$x_{c(310)} = -r_{m1}/((r_{m1}/r_{in}) - 1)^{1/2}$
$x_{c(132)} = -8 * x_{l(120)}$
$x_{l(340)} = n^2 * r_{m1}/q_2$
$x_{c(350)} = -n^2 * r_{m1} * q_2/(q_2^2 + 1)) * (1 - (r_{m2}/(q_2 * (-x_{c(354)}))))$
$x_{c(354)} = -r_{m2}/((r_{m2} * (q_2^2 + 1)/(n^2 * r_{m1})) - 1)^{1/2}$
$x_{l(360)} = r_{m3} * ((r_{m2}/r_{m3}) - 1)^{1/2}$
$x_{c(356)} = -r_{m2}/((r_{m2}/r_{m3}) - 1)^{1/2}$
$x_{l(362)} = r_{m3} * ((r_{(392)}/r_{m3}) - 1)^{1/2}$
$x_{c(370)} = -r_{(392)}/((r_{(392)}/r_{m3}) - 1)^{1/2}$
$x_{inpi} = x_{c(356)} * (x_{l(360)} + x_{l(362)} + x_{c(370)})/(x_{c(356)} + x_{l(360)} + x_{l(362)} + x_{c(370)})$
$x_{sec} = x_{l(340)} * (c_{(350)} + (x_{c(354)} * x_{inpi}/(x_{c(354)} + x_{inpi})))/(x_{l(340)} + x_{c(350)} + (x_{c(354)} * x_{inpi}/(x_{c(354)} + x_{inpi})))$
$x_{in} = x_{l(120)} + (x_{c(310)} * x_{sec}/n^2)/(x_{c(310)} + (x_{sec}/n^2))$
$x = x_{c(354)} * x_{inpi}/(x_{c(354)} + x_{inpi})$
$e_o = e_{in} * n * ((x_{in} - x_{l(120)})/x_{in}) * x/(x + x_{c(350)}) * x_{c(370)}/(x_{c(370)} + x_{l(360)} + x_{l(362)})$
$l_{(120)} = x_{l(120)}/(2 * pi * f)$
$x_{c(310)} = -1/(2 * pi * x_{c(310)})$
$l_{pri} = 1/((2 * pi * f)^2 * c_{(310)})$
$l_{(130)} = (8/9) * l_{(120)}$
$c_{(132)} = -1/(2 * pi * f * x_{c(132)})$
$l_{(340)} = x_{l(340)}/(2 * pi * f)$
$c_{(350)} = -1/(2 * pi * f * x_{c(350)})$
$c_{(354)} = -1/(2 * pi * f * x_{c(354)})$
$l_{(360)} = x_{l(360)}/(2 * pi * f)$
$c_{(356)} = -1/(2 * pi * f * x_{c(356)})$
$l_{(362)} = x_{l(362)}/(2 * pi * f)$
$x_{c(370)} = -1/(2 * pi * f * x_{c(370)})$ -continued $c_{(310)} = 10e^{-9}$
$f = 47505$
$e_{in} = 100$
$n = 2$
$r_{m1} = 671$
$r_{m2} = 2683$
$e_o = -348.6$
$r_{in} = 670$
$r_{(392)} = 150$
$q_2 = 0.5$ wherein: rin is the input resistance looking into network 116 at line 140;

rm1 is the network midpoint resistance across winding 322 looking toward resistance 392;

rm2 is the network midpoint resistance across inductor 340 looking toward resistance 392;

rm3 is the network midpoint resistance at line 384 looking toward resistance 392;

xinpi is the open load impedance across inductor 340;

$e_o$ is the open load output voltage across capacitor 370 with the given $e_{in}$;

n is the transformer 320 turns ratio (winding 324/winding 322); and f is the "design" frequency (preferably 105% of the operating frequency).

Illustrated in FIG. 4 is a further embodiment of current-limiting (ballasting) network 116. Network 116 includes trap 120 and a shunt capacitor 410, which is connected between line 142 and the circuit common. In addition, network 116 includes a "real" transformer (inductive means) 420 having a primary winding 422 connected between line 142 and the circuit common, and a secondary windings 424. Network 116 further includes an inductor means 460, a capacitor 366 and capacitor 370, all of Which are connected in series across secondary winding 424. Load (lamp) 102 is connected across capacitor 370. Network 116 is operative to provide an impedance transformation to couple load (lamp) 102 to the high-frequency AC power source 110 (shown in FIG. 1).

With additional reference to FIG. 3, inductors 312 and 340 are combined with "ideal" transformer 320 to form a "real" transformer 420 as shown in FIG. 4. In addition, a capacitor 366 of suitable capacitance is chosen and the inductance of inductor 362 (or inductor 360) is adjusted to compensate. Further, the inductors 360 and 362 are combined to form an inductor 460. In FIG. 3, the Q of the "LCC" network (inductor 340 and capacitors 350 and 354) is made relatively low such that the calculated capacitance of capacitor 350 is relatively large. When the calculated capacitance of capacitor 350 is sufficiently large, the capacitor is ignored. In that case, capacitors 354 and 356 are combined, and the resultant combined capacitance is transformed to the primary of transformer 320 and combined with capacitor 310 to form a capacitor 410 of FIG. 4. (By basing the calculations on the embodiment of FIG. 3, rather than on the embodiment of FIG. 4, a number of degrees of calculation freedom are obtained.)

FIG. 5 is a detailed schematic diagram of ballast circuit 100. Ballast circuit 100 employs a DC power supply 510, oscillator 202, switching circuit 204, and current-limiting (ballasting) network 116, all for driving the load 102 that includes a number of fluorescent lamps, which are represented by a pair of lamps that are respectively designated 520 and 522.

DC power supply 510 is connected to an AC power line, generally designated by the number 530. The various conductors lines of AC power line 530 include a hot line 532, a neutral line 534 and a ground line 536. DC power supply 510 is operative to receive power from AC power line 530 and to develop a pair of DC voltages, including a primary DC voltage on a line 540 and a parasitic DC voltage on a line 542, both with respect to a circuit common potential developed on a line 544. To develop the line 542 DC voltage, the line is coupled to line 540 by a resistor (not shown). Preferably, DC power supply 510 receives power from AC power line 530 so as to maximize the power factor the DC power supply presents to the AC power line and to minimize the level of harmonic currents the DC power supply generates on the AC power line. Such a DC power supply is disclosed in U.S. Pat. Nos. 5,021,716 and 5,028,846.

Oscillator 202 is configured to generate on a line 550, a high frequency signal, preferably of a square-wave shape. Oscillator 202 is configured around an integrated circuit-type device 554, which is of the type commonly designated 3844. Specifically, device 554 is configured with device pin seven (VCC) connected to the parasitic DC voltage line 542 and with pin six (OUTPUT connected to line 550. In addition, pins three (ISENSE) and five (GROUND) are connected to the circuit common. Further, pin four (RT/CT) is connected to a line 560, pin two (Vfb) is connected to a line 562, pin one (COMP) is connected to line 564, and pin eight (VREF) is connected to a line 566. An oscillation frequency establishing capacitor 570 is connected between line 560 and the circuit common. Represented by a variable resistor 572, preferably six resistors are connected in parallel between lines 566 and 560. (During production of ballast circuit 100, measurements are made of the power the circuit delivers to a load. Based upon the measurements, predetermined certain resistors are cut out of the circuit.) Finally, a bypass capacitor 576 is connected between line 566 and the circuit common. Preferably, capacitor 570 has a capacitance of 4.7 nanofarads; the six resistors represented by resistor 572 have a respective resistance of 560 kilohms, 280 kilohms, 140 kilohms, 69.8 kilohms, 34.8 kilohms, and 4.02 kilohms, and capacitor 576 has a capacitance of 0.1 microfarads.

A feed-forward circuit is employed for mitigating the effect of ripple on the DC voltage developed by DC power supply 510 on voltage line 540 (with respect to the circuit common potential). Specifically, the feed-forward circuit varies the power delivered to fluorescent lamps 520 and 522 by varying the oscillation frequency of oscillator 202 responsive to the instantaneous level of the DC voltage developed on line 540. As the instantaneous level of the DC voltage on line 540 rises, the feed-forward circuit increases the level of the current in capacitor 570. For this purpose, the feed-forward circuit includes a zener diode 580 and a pair of resistors 582 and 584. For coupling the ripple component of the line 540 voltage to a line 586 the cathode of diode 580 is connected to line 540 and its anode is connected to line 586. For converting the ripple voltage to a ripple current, resistors 582 and 584 are connected in a voltage divider configuration with resistor 584 connected between line 560 and the circuit common and resistor 582 connected from line 586 to line 560. Zener diode 586 is of the type commonly designated 1N5264; and resistors 582 and 584 have a respective resistance of one megohm and 26.1 kilohms. As above indicated, the feed-forward circuit varies the oscillation frequency of oscillator 202 responsive to the instantaneous level of the DC voltage developed on line 540. In an alternative embodiment, the feed-forward circuit varies the oscillation pulse width (duty cycle) of oscillator 202 responsive to the instantaneous level of the DC voltage developed on line 540. In still another embodiment, the feed-forward circuit varies the oscillation "on time" pulse width (duty cycle and frequency) of oscillator 202 responsive to the instantaneous level of the DC voltage developed on line 540.

A feedback circuit is employed for maintaining a relatively constant power level in fluorescent lamps 520 and 522. Specifically, the feedback circuit varies the power delivered to the lamps by varying the frequency of (frequency modulating) oscillator 202 responsive to the level of the current in current limiting network 116. For this purpose, the feedback circuit includes a resistor 590, a capacitor 592, a diode 594, and a pair of resistors 596 and 598. To develop a sense current, resistor 590 and capacitor 592 are connected to receive and integrate a small sense voltage, which is developed on a line 600 (with respect to the circuit common potential) from the current in network 116. For this purpose, resistor 590 and capacitor 592 are connected in a low-pass integrator configuration with the resistor connected between line 600 and a line 602 and with the capacitor connected between line 602 and the circuit common. For converting the integrated voltage to a current for driving oscillator 202, diode 594 is configured as a current steering diode with its anode connected to line 602 and with the cathode connected to a line 604. Resistor 596 is connected between line 604 and a line 606 and resistor 598 is connected between lines 606 and 560. Resistor 590 has a resistance of thirteen kilohms, capacitor 592 has a capacitance of 2.2 nanofarads, diode 594 is of the type which is commonly designated 1N4148, and resistors 596 and 598 have a respective resistance of eighteen kilohms and twenty kilohms. As above indicated, the feedback circuit varies the oscillation frequency of oscillator 202 responsive to the level of the current in current-limiting (ballasting) network 116. In an alternative embodiment, the feedback circuit varies the oscillation pulse width (duty cycle) of oscillator 202 responsive to the level of the current in current-limiting network 116. In still another embodiment, the feedback circuit varies the oscillation "on time" pulse width (duty cycle and frequency) of oscillator 202 responsive to the level of the current in current-limiting (ballasting) network 116.

Also employed are a lamp out of socket detector 608 and a soft start circuit means 609 which share a number of components. The lamp out of socket detector 608 is employed to turn off oscillator 202 for a predetermined time delay following operation with fluorescent lamps 520 and 522 removed. For this purpose, the lamp out of socket detector subcircuit 608 includes a diode 610, a resistor 612, a capacitor 614, a pair of resistors 616 and 618, and another diode 620. Diode 610 is configured as a current steering diode with its anode connected to line 602 and the cathode connected to a line 622. Resistor 612 and capacitor 614 are connected in a low-pass (integration) configuration with the resistor 612 connected between line 622 and a line 624 and with the capacitor 614 connected between line 624 and the circuit common. Resistors 616 and 618 are connected in a voltage divider configuration with resistor 616 connected between lines 624 and 562 and with resistor 618 connected between line 562 and the circuit common. To discharge capacitor 614 following shut down, diode 620 is configured as a current steering diode with its anode connected to line 624 and the cathode connected to line 566. Operationally, when fluorescent lamps 520 and 522 are removed, the level of the current in current-limiting (ballasting) network 116 increases, increasing the level of the voltage developed across capacitor 592. The lamp out of socket detector 608 integrates the capacitor 592 voltage with resistor 612 and capacitor 614 to provide a predetermined time delay. Resistor 616 Couples the voltage developed across capacitor 614 to line 562 to drive oscillator 202 device 554 pin two to turn off the oscillator. Components shared with the soft start circuit 608, in conjunction with the Oscillator 202 device 554, provide positive feedback, to latch and turn off the oscillator, as will become apparent shortly. Diode 620 discharges capacitor 614 following shut down. The time delay before shut down is two seconds (determined by the time for the voltage developed across capacitor 624 to reach preferably, 2.5 volts). Preferably, diode 610 and 620 are each of the type commonly designated 1N4148 and capacitor 614 has a capacitance of ten microfarads. Further preferably, resistors 612, 616 and 618 have a respective resistance of 56 kilohms, 22 kilohms arid 750 kilohms.

The soft start circuit means 609 is employed to soft start fluorescent lamps 520 and 522. For this purpose, in addition to resistor 598, the soft start circuit 609 includes a diode 650, a pair of resistors 652 and 654, a capacitor 656, a transistor 660, another pair of resistors 652 and 664 and another diode 666. Diode 650 is configured as a current steering diode, its cathode connected to line 566 and the anode connected to a line 670. Capacitor 656 is connected as a time-constant capacitor connected between line 670 and the circuit common. Resistors 652, 654 and 662 are connected as current-limiting and transistor 660 biasing resistors, with resistor 652 connected between line 566 and a line 672, with resistor 654 connected between lines 672 and 670 and with resistors 662 connected between line 672 and a line 676. Diode 666 is also connected as a current steering diode with its anode connected to line 676 and the cathode connected to line 564. Transistor 660 is connected with its emitter connected to line 566, the base connected to line 672 and the collector connected to line 606. Finally, resistor 664 is connected between lines 606 and 562. Operationally, when oscillator 202 is first turned on, capacitor 656 is uncharged. While capacitor 656 charges (through resistor 654 and the base emitter junction of transistor 660), the voltage level developed across the capacitor biases the transistor into the on state, pulling up the level of the potential developed on line 606. The relatively high potential level developed on line 606 develops a relatively high current level in resistor 598, causing oscillator 202 to operate at a frequency higher than normal (preferably, 55 kHz). At the higher frequency, a voltage level is developed across fluorescent lamps 520 and 522 which is insufficient to ionize (start) the lamps. However, during this time the fluorescent lamp 520 and 522 cathodes are heating. When capacitor 656 charges (to the transistor 660 base-emitter junction voltage drop), the transistor is quickly turned off, quickly lowering to normal the frequency of oscillator 202 to start fluorescent lamps 520 and 522. As a consequence, fluorescent lamps 520 and 522 are started in a controlled fashion. Diode 650 resets capacitor 656 when the power is turned off. Preferably, diodes 650 and 666 are of the type commonly designated 1N4148, transistor 660 is of the type commonly designated 2N3906, and resistors 598, 652, 654, 662 and 664 have a respective resistance of twenty kilohms, 470 kilohms, 750 kilohms, 750 kilohms and 470 kilohms. When oscillator 202 is first turned on, the soft start circuit 609 causes the oscillator to operate at a higher than normal frequency for a predetermined period. In another embodiment, when oscillator 202 is first turned on, the soft start circuit 609 changes the pulse width (duty cycle) of the oscillator for the predetermined period.

As previously indicated, when fluorescent lamps 520 and 522 are removed, the level of the current in current-limiting (ballasting) network 116 increases, increasing the level of the voltage developed across capacitor 592. The lamp out of socket detector 608 integrates the capacitor 592 voltage to provide the predetermined time delay. Resistor 616 couples the voltage developed across capacitor 614 to line 562 to drive oscillator 202 device 554 pin two. When device 554 pin two is drive high, the device drives low the voltage developed on device pin one. As a consequence, device 954 (pins one and two) in conjunction with transistor 660 provide positive feedback to latch and turn off the oscillator 202. Diode 620 resets capacitor 614 when the power is turned off In FIG. 5, switching circuit 204 is configured to be responsive to the high frequency signal generated on line 550 by oscillator 202 and operative to periodically couple line 140 to the circuit common. For this purpose, switching circuit 204 includes a diode 702, a resistor 704, a capacitor 706 and a transistor 708. Resistor 704 and capacitor 706 are connected to slow down the rise time of the voltage developed at the gate of transistor 708, to slow down the rate at which the transistor must discharge parasitic capacitances at the transistor drain and to reduce the required peak current requirements of the transistor. Specifically, resistor 704 is connected between line 550 and a line 710 and capacitor 706 is connected between lane 710 and the circuit common. To maintain a fast fall time of the voltage developed at the gate of transistor 708, diode 702 is configured as a current steering diode with its cathode connected to line 550 and with the anode connected to line 710. Transistor 708 is configured with its gate connected to line 710, the drain connected to line 140 and the source connected to,the circuit common. Although a bipolar-type transistor, an IGBT-type device, or a SCR-type device may be employed for transistor 708, in the presently preferred embodiment a MOS field effect (FET) type is employed, preferably of the type commonly designated 6N60. (A 6N60 transistor has a BVDSS of 600 volts and an RDS(on) of 1.2 ohms.) Preferably, diode 702 is of the type commonly designated 1N4148, resistor 704 has a resistance of 270 ohms and capacitor 706 has a capacitance of one nanofarad.

Employed in FIG. 5 is the embodiment of current-limiting (ballasting) network 116 which is shown in FIG. 4. In one embodiment, capacitor 410 is connected to the circuit common (preferably, the source of transistor 708). In the presently preferred embodiment, capacitor 410 is connected between line 142 and line 540 to reduce the DC voltage (stress) across the capacitor.

Transformer (inductive means) 420 is connected with one end of primary winding 422 connected to DC power supply 510 and the other end connected to line 142. In addition to functioning as part of current-limiting (ballasting) network 116, transformer (inductive means) 420 provides isolation for fluorescent lamps 520 and 522 (for safety) and provides DC power for oscillator 202. For the latter purpose, transformer 420 has an additional secondary winding 748 connected between the circuit common and the anode of a current steering diode 758, the cathode of which is connected to power supply 510 by parasitic DC voltage line 542. A high-frequency bypass capacitor 760 and a filter capacitor 762 are connected in parallel between line 542 and the circuit common. In the preferred embodiment, current steering diode 758 is of the type commonly designated 1N4148 and capacitors 760 and 762 have a respective capacitance of 0.22 microfarads and 47 microfarads.

Fluorescent lamps 520 and 522 are connected in series across capacitor 370. As a starting aid, a capacitor 780 is connected in parallel with fluorescent lamp 520. To provide current for the filaments of fluorescent lamps 520 and 522, small windings are wound around inductor 130.

To develop the small feeback sense voltage, a small number of turns of wire are wound around transformer (inductive means) 460 to form a sensing winding. (The small sense voltage is integrated by resistor 590 and capacitor 592 to develop across the capacitor a voltage which is proportional to the level of the current in inductor 460.) The sense winding is connected between the circuit common and line 600.

In the preferred embodiment, current-limiting (ballasting) network 116 has a design frequency of 49.5 kilohertz. The oscillator 202 is operated at 47 kilohertz, 95% of the design frequency; and inductor 130 and capacitor 132 are resonant at 153 kilohertz, slightly higher than the third harmonic frequency of the oscillator. Further, trap inductor 130 has an inductance of 72 microhenrys and a high frequency ferrite core of the material designated PC40 by TDK and of the size which is commonly designated E25. Further, preferably, inductor 130 has a (main) winding of thirty turns of copper 40-38 Litz wire. To provide current for the filaments of fluorescent lamps 520 and 522, preferably, inductor 130 has three additional windings each of which consists of one turn of 34 AWG plastic insulated copper wire. Preferably, capacitor 132 has a capacitance of 15 nanofarads, to resonate with inductor 130 at a frequency of 153 kilohertz.

In addition, for impedance transforming purposes, transformer (inductive means) 420 has a primary inductance of 0.9 millihenrys and a high frequency ferrite core of the material which is designated PC30 by TDK and of the size commonly designated E375. Preferably, primary winding 422 has 65 turns of copper 10-32 Litz wire, secondary winding 424 has 130 turns of 6-34 copper Litz wire, and secondary winding 748 has five turns of 30 AWG enameled copper wire. In the presently preferred embodiment, for impedance transformation purposes, inductor 460 has a primary inductance of 2.11 millihenrys and employs one-half of a core set of the material commonly designated PC30 and of the size commonly designated E375. (The completion of the magnetic path is through the back of one of the cores of transformer 420.) Further, preferably, inductor 460 has a primary winding of 142 turns of copper 6-34 Litz wire and a secondary winding of seven turns of 32 AWG enameled copper wire. One layer of tape is used between the windings. Preferably, capacitor 366 has a capacitance of 68 nanofarads; capacitor 370 includes a series combination of two 15 nanofarad capacitors; and capacitor 780 has a capacitance of 220 picofarads.

Finally, in the presently preferred embodiment, fluorescent lamps 520 and 522 are of the type which is commonly designated F40T12 (fluorescent, 40-watt, tubular, twelve-eighths-inch diameter).

The above preferred embodiment has an overall electrical efficiency of 91%, while using relatively inexpensive components. The preferred embodiment is very immune to lamp impedance, allowing the use of 34-watt T-12 lamps as well as forty-watt lamps over a wide temperature range. (34-watt T-12 lamps have a significantly lower impedance than forty-watt T-12 lamps.) Additionally, because the input voltage waveform to the network (after the trap) is (nearly) sinusoidal, the lamp Current waveform is also very good.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

I claim:

1. A ballast circuit, comprising:

an alternating current (AC) power source (110) including an output switch transistor (204, 224, 244, 264) for operating at a first frequency;

at least one parallel-resonant trap (120, 276, 278) connected to be driven by said transistor in the AC power source (110) and including a first capacitor means (132,292,296) and a first inductor means (130, 290, 294) connected in parallel providing for frequency resonance at a second frequency which is slightly higher in frequency thatn an odd harmonic of said first frequency, wherein said output switch transistor switches at one of a zero-voltage point and a zero-current point according to the relationship of said first frequency to said second frequency; and a negative-resistance load (102) connected with an impedance transforming network (122) in series with an AC power source (110) and the at least one parallel-resonant trap (120, 276, 278), said impedance transformer network (122) including-a second inductor means (420) connected to said at least one parallel-resonant trap (120), third inductor means (460), second capacitor means (366), and third capacitor means (370) connected in series with said third inductor means (460) and said second capacitor means (366) across said second inductor means (420), said negative-resistance load (102) being connected across said third capacitor means (370).

2. The ballast circuit of claim 1, wherein:

the at least one parallel-resonant trap is an integral part of the impedance transforming network.

3. The ballast circuit of claim 2, wherein:

said output switch is active for approximately 180 degrees of each cycle of said first frequency.

\* \* \* \* \*